INVENTOR
Ralph F. Taber

March 22, 1949.  R. F. TABER  2,465,180
APPARATUS FOR MEASURING THE STIFFNESS
OF FLEXIBLE MATERIAL
Filed Dec. 8, 1945  5 Sheets-Sheet 2

INVENTOR
Ralph F. Taber
BY
ATTORNEY

March 22, 1949. R. F. TABER 2,465,180
APPARATUS FOR MEASURING THE STIFFNESS
OF FLEXIBLE MATERIAL
Filed Dec. 8, 1945 5 Sheets-Sheet 3

INVENTOR
Ralph F. Taber
BY
ATTORNEY

March 22, 1949.  R. F. TABER  2,465,180
APPARATUS FOR MEASURING THE STIFFNESS
OF FLEXIBLE MATERIAL Filed Dec. 8, 1945  5 Sheets-Sheet 4

INVENTOR
Ralph F. Taber
BY

ATTORNEY

March 22, 1949.  R. F. TABER  2,465,180
APPARATUS FOR MEASURING THE STIFFNESS
OF FLEXIBLE MATERIAL
Filed Dec. 8, 1945  5 Sheets-Sheet 5

INVENTOR
Ralph F. Taber
BY
ATTORNEY

Patented Mar. 22, 1949

2,465,180

UNITED STATES PATENT OFFICE 2,465,180

APPARATUS FOR MEASURING THE STIFFNESS OF FLEXIBLE MATERIAL

Ralph F. Taber, Buffalo, N. Y.

Application December 8, 1945, Serial No. 633,790

10 Claims. (Cl. 73—100)

This invention relates to improvements in apparatus for testing and measuring the stiffness of flexible material such as paper, cardboard, fibrous materials, leather, imitation leather, metal foils, filaments, spring wire strips, textiles, sheet metal and other similar materials.

The invention in this application is an improvement on the invention disclosed in Patents Nos. 2,113,389, April 5, 1938, and 2,063,275, Dec. 8, 1936.

The invention comprehends improving an apparatus for measuring the stiffness of flexible material by providing the relatively movable members that support a strip of material to be tested, with indicating means for cooperation with each other to register, in different relative positions of the two members to each other, for indicating when a test strip has been flexed to a desired degree, said indicating means providing a cooperation to indicate the stiffness of the material when flexed a given amount indicated by the indicating means.

The invention comprehends the provision of a motor drive connected to one of a pair of members mounted for relative movement so that the motor will drive the member for moving it relative to the other in flexing a strip being tested, suitable control means for the motor being provided for manual operation to secure operation of the motor to rotate the driving member in either of two directions and at the same time, provide a braking means for stopping it in a desired angular position.

The invention provides an apparatus for testing flexible material having a pair of strip supporting and flexing members mounted on a plate for relative movement thereto and to each other with a driving mechanism for rotating one of the members by a power driven mechanism with a suitable control for the mechanism that is manually operable, also mounted on said plate to provide a convenient mounting and assembly of the operating, control and flexing mechanism so arranged that precision is obtained in assembly of the parts.

The invention comprehends the provision of an instrument for measuring the stiffness of flexible material having precision-built operating parts mounted on a scale plate on which they are readily assembled, together with a housing having an open side to which the scale plate is secured and in which the driving and controlling mechanism for the relatively movable members, is conveniently housed and a suitable support provided for the assembled mechanism so that it can be placed on a table or other suitable supporting surface in a level position.

The invention provides a pair of strip engaging members on one of the pair of relatively movable members that are movably mounted on said one member so that either a roller or pointed pin carried at opposite ends of said strip engaging member can be brought into position while engaging the test specimen according to the type of test to be made.

The invention provides for the automatic control of the motor to automatically stop the operation of the motor and simultaneously and automatically apply a braking force to hold the relatively movable members against further movement.

The invention comprehends other improvements in the construction and assembly of a stiffness testing apparatus that will be more fully pointed out in the following description and claims.

Figures 1, 5:
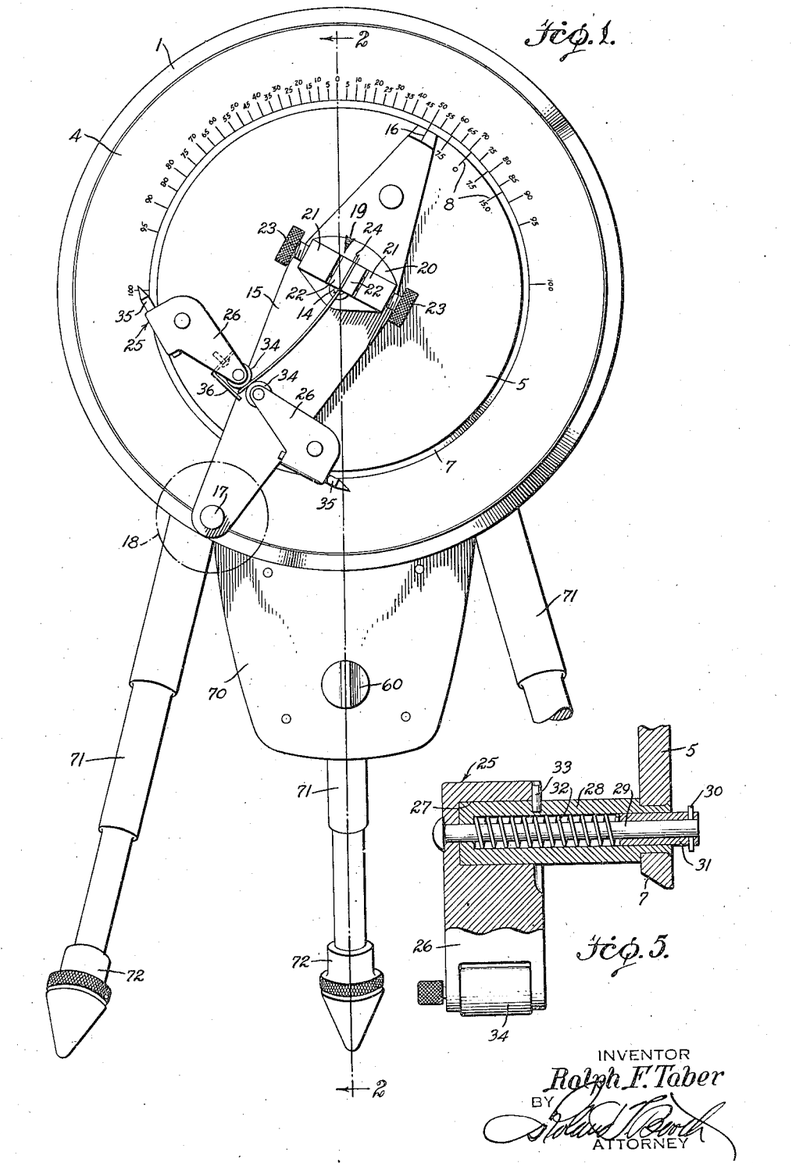
Fig. 1 shows an improved testing apparatus in front elevation with the pendulum and driving member shown in a position with a test specimen flexed in one direction to a fifteen degree angle.
Fig. 5 is an enlarged cross-section taken on line 5—5 of Fig. 8 with portions shown in elevation showing details of construction of one of the loading arms.
Figures 2, 11:
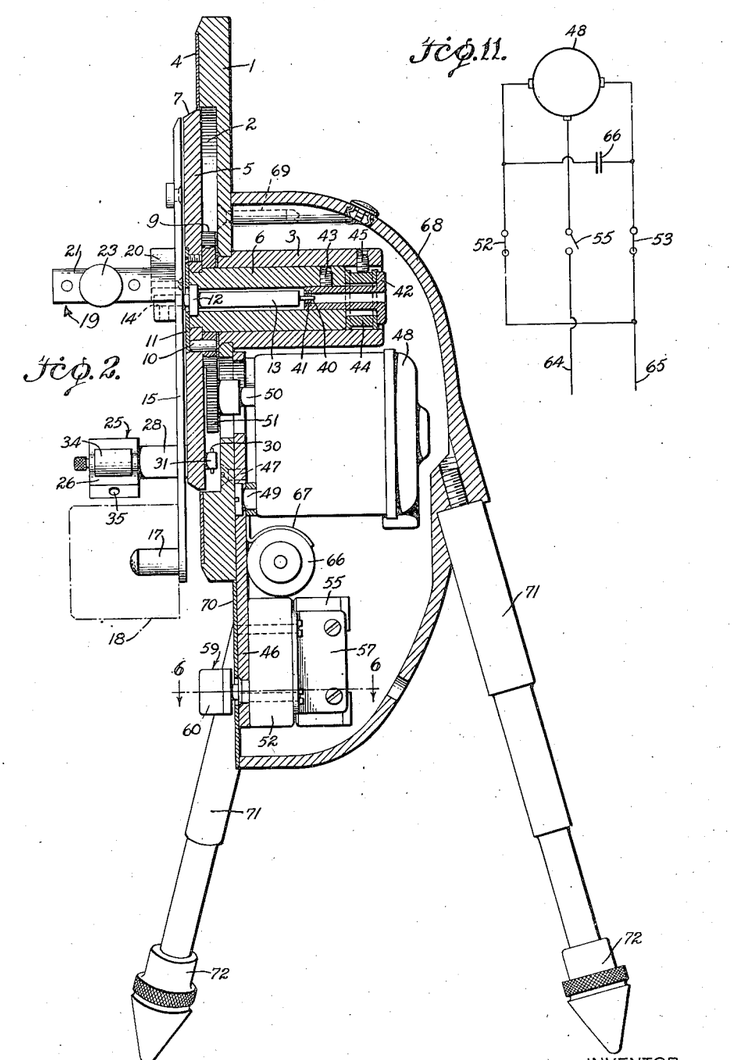
Fig. 2 is a vertical transverse cross-section taken on line 2—2 of Fig. 1 with the pendulum and driving disc shown in the central neutral position.
Fig. 11 is a wiring diagram for the motor and switch control circuits of the apparatus as illustrated in Figs. 1 to 10.

A scale plate 1 of circular form has a central annular recess 2 formed in the front face thereof and a bearing sleeve 3 mounted in the center of plate 1 at one end and projecting rearwardly therefrom, as clearly shown in Fig. 2. The front face of scale plate 1 about recess 2, has a scale ring 4 rigidly mounted thereon. Scale ring 4 is provided with a plurality of graduations arranged in radial relation about the inner arcuate margin thereof, as shown in Fig. 1. These graduations extend about the upper half of ring 4 and have a zero point on the scale in the vertical plane of the axis of the ring.

A driving disc 5 carries a centrally arranged bearing sleeve 6 projecting rearwardly therefrom and rotatably engaged in bearing sleeve 3 for rotatably mounting disc 5 in front of scale plate 1 with the rear portion received in recess 2 in the manner shown in Fig. 2. The periphery of disc 5 is beveled in advance of scale ring 4, as indicated at 7. Indicating means in the form of a plurality of radial marks 8 are provided at predetermined positions on bevel portion 7 of driving disc 5 and the adjacent front face of the disc. The central mark 8 is arranged to align with the zero point on the scale provided on scale ring 4, as shown in Fig. 1, when a test specimen is in unstressed position. The marks on the disc at opposite sides of this central mark of the group are arranged at 7½° and 15° angles, respectively, relative to this central mark. These marks 8 register with the radial marks forming the scale on the scale ring carried by scale plate 1 for cooperation therewith in a manner that will hereinafter be described.

The rear face of driving disc 5 is spaced from the bottom of recess 2, as shown in Fig. 2, to accommodate driven member or gear 9 mounted on bearing sleeve 6 against the rear face of disc 5. One or more pins 10 retain driven gear 9 against rotation relative to disc 5 and provide the means for transmitting rotative movement applied to gear 9 for rotating disc 5 in the operation of the instrument. The central portion of driving disc 5 is provided with a recess in the front face for receiving bearing retainer 11 adapted to retain a ball bearing member 12 in a recess in the front end of bearing sleeve 6.

A shaft 13 has a reduced extension on the forward end thereof mounted in bearing 12 with a shoulder formed by the reduced extension engaging the rear face of bearing 12. Reduced extension 14 extends through bearing 12 and an opening in bearing retainer 11 and rigidly mounts pendulum 15 on the forward end thereof. Pendulum 15 is formed of a flat metal strip extending diametrically across driving disc 5 in contiguous but slightly spaced relation, as clearly shown in Figs. 1 and 2. The upper end of pendulum 15 is provided with a beveled portion terminating adjacent bevel 7 on the periphery of disc 5, having an indicator mark 16 thereon arranged in radial relation for alignment and registry with marks 8 on disc 5 and the marks on scale ring 4. The opposite end of pendulum 15 extends below the lower peripheral portion of driving disc 5 and carries a forwardly projecting stud 17 for detachably receiving one of a plurality of weights 18.

The central portion of pendulum 15 carries a specimen clamp of U-shaped construction having base 20 secured to the front face of the pendulum strip with arms 21 extending forwardly from the strip in spaced perpendicular relation and having the lower edges arranged in the plane of the axis of driving disc 5 and scale plate 1. Clamping bars 22, one for each arm 21, are provided with guide pins slidably mounting bars 22 on arms 21, while clamping screws 23 threaded in arms 21 are manually operable to move clamping bars 22 toward and from each other between arms 21 in clamping and releasing test specimens therebetween. Indicator marks 24 are provided on base 20 of specimen clamp 19 at the upper portion, as shown in Fig. 1, as a guide for aiding in clamping a test specimen between clamping bars 22 in a center position in the plane of the axis of the driving disc. The reduced extension 14 on shaft 13 extends through base 20 of specimen clamp 19. The strip forming pendulum 15 is secured to base 20 of specimen clamp 19 and a set screw in base 20 provides a convenient means for rigidly securing the pendulum and specimen clamp on shaft 13.

A pair of loading arms 25 are mounted in spaced relation on the lower portion of driving disc 5 and spaced in front of the disc for alignment with specimen clamp 19. Each loading arm has a body 26 formed with a socket 27 rotatably receiving the forward end of a tubular stud 28 rigidly secured to the lower portion of driving disc 5. A rod 29 has one end rigidly secured to body 26 while the remaining portion extends through tubular stud 28 in which it is rotatably mounted. A transversely extending pin 30 is mounted in the rear end of rod 29 and engaged through bearing sleeve 31 slidable and rotatable in the rear end of tubular stud 28. A compression spring 32 encircles rod 29 between the inwardly extending flange on the outer end of stud 28 and bearing sleeve 31 within the tubular stud, as clearly shown in Fig. 5. This structure provides a rotatable mounting for body 26 on stud 28 and also provides for limited endwise movement of body 26 on stud 28 until the outer ends of transversely extending pin 30 engage the rear end of bearing sleeve 28.

Loading arms 25 are normally held in either of two positions against rotative movement on tubular stud 28. Each stud has a radially extending pin 33 extending inwardly toward the other stud and adapted to engage in a groove formed in the rear face body 26 (see Fig. 5). The groove in the rear face of body 26 extends diametrically at opposite sides of the opening for receiving tubular stud 28 so as to retain the body in either of two positions.

Each loading arm 25 has the body 26 thereof constructed with a long portion and a short portion. The long portion has the end bifurcated to rotatably mount a roller 34 in the bifurcated end with the periphery of the roller extending beyond the end of the body. Body 26 has the short portion formed with a small bore receiving a pin 35 having a tapered point. The pin is secured in the bore in body 26 with the pointed end projecting outwardly in a direction opposite to the longer portion of the body. The left-hand body 26, as shown in Fig. 1, has a specimen supporting finger 36 secured in the bifurcated portion of the body arranged to extend outwardly in spaced relation beyond roller 34 to lie in a substantially horizontal plane when the longer portion of the body is extended inwardly toward the opposed body 26. When the long portions of the bodies forming the loading arms are extended inwardly toward each other, rollers 34 will have their peripheries terminating in adjacent spaced relation with the specimen supporting finger below them in position to receive the lower edge of a specimen and support the specimen in position while it is being clamped in specimen clamp 19. This position of loading arms 25 is shown in Fig. 1 where they are held by radially extending pins 33 engaging in the grooves in the rear faces of bodies 26. By pulling bodies 26 forwardly on tubular studs 28, they may be rotated upon disengagement of pins 33 from the grooves in the bodies. The bodies may be rotated into diametrically opposite positions with the pointed pins 35 extending toward each other. In this new position pins 33 will engage in the opposite portions of the grooves in the rear of bodies 26. These pointed pins are used in testing specimens in a manner that will be hereinafter described.

The rear end of shaft 13 is provided with a reduced extension 40 rotatably engaged in ball bearing 41 mounted in the forward end of a flanged tubular retaining member 42. The forward end of retaining member 42 slidably engages in the rear end of bearing sleeve 6 in which it is adjustably retained by means of set screw 43. The flange of retaining member 42 is on the rear end thereof, as shown in Fig. 2, and engages the rear face of retaining collar 44 having the front face engaged with the rear end of bearing sleeve 6. Retaining collar 44 engages in the rear end of bearing sleeve 3 in the manner shown in Fig. 2 and is retained in bearing sleeve 3 in eccentric relation thereto against movement by set screw 45. Retaining collar 44 in cooperation with retaining member 42, operates to hold driving disc 5 and pendulum 15 in assembled relation with scale plate 1 against endwise movement. Shaft 13 and bearing sleeve 6 are also retained against endwise movement relative to bearing sleeve 3. At the same time, retaining collar 44 holds these parts in spaced contiguous relation for free rotation relative to each other.

A switch plate 46 is secured to the lower portion of the rear face of scale plate 1 by a plurality of screws, such as indicated at 47, and depends below the periphery of scale plate 1, as shown in Fig. 2. A reversible electric motor 48 of conventional form is secured to plate 46 by means of a plurality of screws 49. The motor may include suitable reduction gearing for rotating drive shaft 50 extending forwardly from one side of the motor case through an opening in switch plate 46 and scale plate 1 and supporting driving member or pinion 51 on the forward end thereof meshed with driven gear 9, as shown in Fig. 2. It will thus be seen that rotation of the motor will rotate shaft 50 and driving pinion 51 to rotate driven gear 9 and driving disc 5 in either direction depending upon the direction of rotation of the motor armature.

Suitable control means for motor 48 is mounted on the lower end of switch plate 46 and is manually operable for securing operation of the motor to rotate driving disc 5 in either direction. For this purpose, a pair of direction control switches 52 and 53 are mounted in spaced opposed relation on the lower end of switch plate 46. These switches 52 and 53 are of the type well-known by the name "Micro-switch" and have operating pins 54 extending toward each other in aligned relation. A similar circuit control switch 55 is mounted in the rear of switches 52 and 53 in right angular relation thereto with an operating pin 56 extending forwardly in the same horizontal plane as pins 54. Angle brackets 57 provide the means for securing circuit control switch 55 to switches 52 and 53 in the manner shown in Fig. 6. A U-shaped bracket 58 is mounted in the space between switches 52, 53 and 55 on switch plate 46 and has the bottom portion apertured in aligned relation with switch plate 46 for receiving the shank of switch operating member 59. The forward end of switch operating member 59 has handle 60 mounted thereon in front of switch plate 46, while the rear end is provided with a flat switch operating head 61 carrying a transverse pin 62 projecting above and below the head and engaging in slots 63 formed in the rear ends of the legs of bracket 58.

By pushing rearwardly on handle 60, switch operating member 59 can be moved so that the rear end of head 61 will engage operating pin 56 for operating switch 55. By moving handle 60 sideways, in either direction, head 61 will pivot about pin 62 and engage one of the operating pins 54 of switches 52 and 53 and operate one of these switches, depending upon the direction of sidewise movement of handle 60.

Motor 48 is connected to a source of current supply through switches 52, 53 and 55 in the manner shown in the wiring diagram in Fig. 11. One side of the current supply line indicated at 64 is connected to switch 55 which is normally open. The other terminal of switch 55 is connected to one terminal of motor 48. The other side of the current supply line, indicated at 65, is connected to one terminal of switches 52 and 53, which are normally closed. The other terminals of switches 52 and 53 are connected by independent circuits to two terminals of motor 48 connected in the circuit of the motor, one for the rotation in one direction and the other for the circuit for securing rotation of the motor in the opposite direction. A condenser 66 is connected across the circuit connections between the switches 52 and 53 and motor 48.

Condenser 66 is carried by a bracket 67 mounted on the rear face of switch plate 46 above switches 52 and 53, as shown in Fig. 2. With this circuit arrangement, it will be understood that circuit control switch 55 normally maintains the circuit to motor 48 open. When it is desired to secure the operation of the motor in testing a specimen, handle 60 is moved rearwardly to operate switch 55 into closed position. This energizes the motor through the circuits operating the motor in both directions so as to hold the motor armature in a stationary position. By moving the switch control member to the right or to the left, the sidewise movement will operate one of the operating pins 54 and open either switch 52 or 53. As soon as one of the switches 52 or 53, controlling the direction of the motor rotation, is opened, then the circuit through the closed switch will energize the motor to rotate in one direction.

From the above description, it will be understood that the operating parts of the structure are all assembled on scale plate 1. This assembled structure on the scale plate is mounted on a housing 68. Housing 68 has a front open portion over which scale plate 1 is mounted and secured to the housing by means of screws 69 engaged through openings in scale plate 1 opening in the front recess 2. Screws 69 rigidly attach the assembled structure on scale plate 1 to housing 68. Bearing sleeve 3 and the parts assembled therein, together with motor 48, condenser 66 and the circuit control assembly including switches 52, 53 and 55 will all be contained within housing 68, in the manner shown in Fig. 2. A cover plate 70 is secured to the front face of switch plate 46 over the lower portion of the housing below scale plate 1 to provide a closure for the bottom portion of the housing.

In the form of the invention as illustrated in Figs. 1 and 2, the housing is provided with sockets for receiving three supporting legs 71 providing a tripod support for the assembled testing instrument. The lower ends of each of the legs are provided with supporting feet 72 threaded thereon so that they may be adjusted for leveling the instrument in supported position on a table or the like, in order that the indicating mark on the pendulum can be aligned with the scale marking for the zero position on the scale plate, in view of the fact that the pendulum normally gravitates into a vertically extending position. The weight of the lower end of the pendulum normally resists movement of the pendulum out of the vertical position and this feature is used in securing the flexing of specimens during the testing operation, as will be described.

In using the instrument as hereinabove described, a test specimen of fixed size is inserted in specimen clamp 19 between clamping bars 22 with the lower end resting on specimen supporting finger 36. The rear edge of the specimen will be moved up against the base 20 of the specimen clamp and clamping screws 23 operated to move clamping bars 22 into engagement with opposite sides of the test strip for firmly clamping it in a center position in which the test strip will be aligned with the center mark on base 20 of the specimen clamp. The loading arms will be positioned as shown in Fig. 1 with rollers 34 in adjacent relation and the lower end of the strip located between rollers 34. The test strip will then be supported in a vertically extending position ready to be tested.

The circuit as shown in the wiring diagram, is connected to motor 48 so that by moving handle 60 of the control means to the right, as shown in Fig. 1, the motor will be energized to rotate driving disc 5 in a clockwise direction to flex a specimen, as shown in Fig. 1. This will move the lower end of the test strip to the left, as shown in Fig. 1, for gradually bending the strip as disc 5 rotates. The stiffness of the test strip will cause the pendulum 15 to rotate on its mounting in a clockwise direction. This operation is carried on until the indicating mark 16 on the upper end of pendulum 15 registers with the indicating mark 8 on disc 5 to the left of the center mark at the 15° angle when handle 60 which has been held in rearwardly operated position and to the right, will be moved back to the center position, but held in the rearward position in which switch 55 is held closed. This will operate to use the motor as a brake for stopping rotation of disc 5 when the marks on pendulum 15 and disc 5 are aligned with one another. A reading of the stiffness index of the test strip can then be made made on the graduation of the scale on scale ring 4.

Then, by moving handle 60 to the left, as shown in Fig. 1, while maintaining switch 55 closed through rearward pressure thereon, the driving disc will be caused to rotate in a counter-clockwise direction. This rotation is maintained until the specimen is flexed in the opposite direction to the point where the right-hand mark on the upper portion of disc 5 is aligned with the indicating mark 16 on the end of pendulum 15. The switch is moved to the center position while it is held in rearwardly pressed position to maintain switch 55 closed in order to use the motor as a brake for stopping the disc 5, with marks 8 and 16 in registry. This will indicate the stiffness unit for the flexed strip in the opposite direction when flexed to the 15° angle. By averaging the reading in both directions, the stiffness index of the test strip is obtained. With some specimens, it is not convenient to flex them through a 15° angle in which case, the marks for the 7½° angle are used in testing the specimen in the same manner as hereinabove described.

Figures 3, 6, 7, 8, 9:
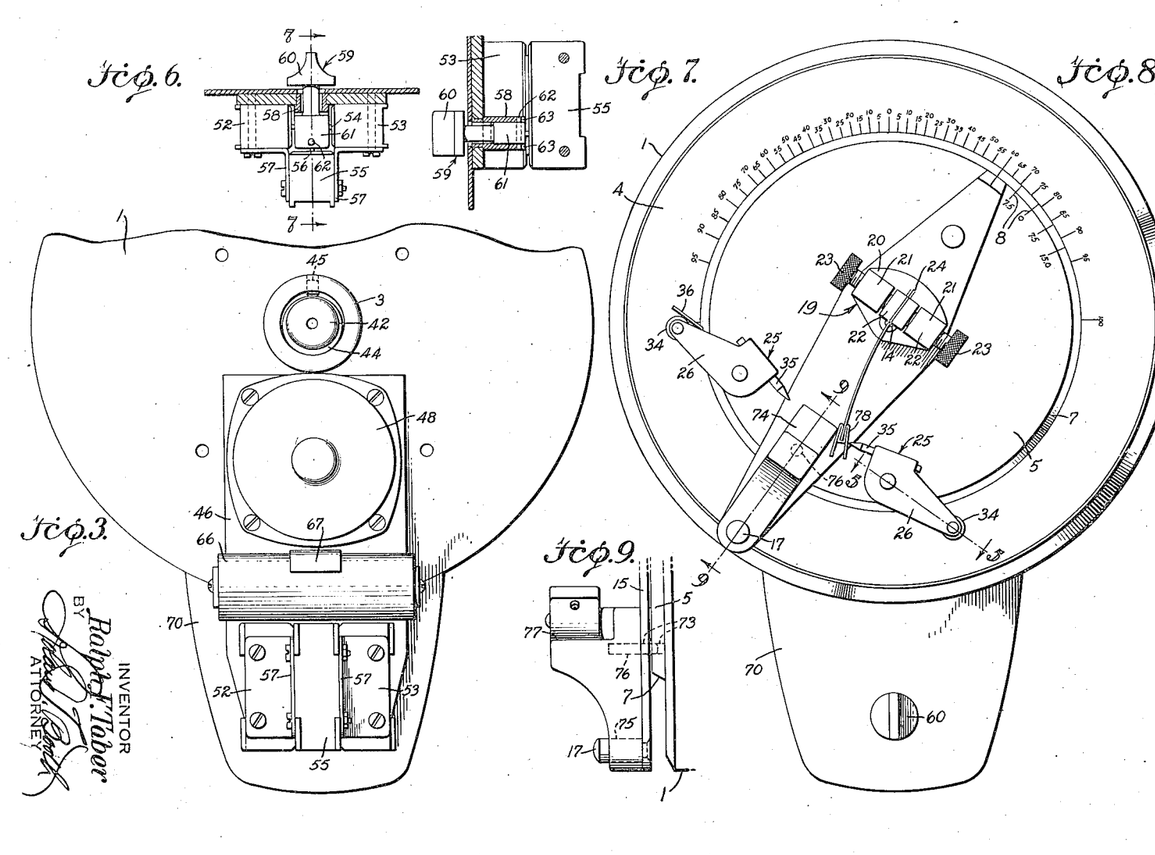
Fig. 3 is a rear fragmentary elevation of the scale and switch plates showing the bearing sleeve, motor and switch assembly thereon.
Figs. 6 and 7 are cross-sections taken on lines 6—6 of Fig. 2 and 7—7 of Fig. 6, respectively, showing details of the control switch mounting and operating structure.
Fig. 8 is a front elevation of the testing instrument showing the sensitive testing attachment structure with a test specimen flexed in one direction to a fifteen degree angle.
Fig. 9 is a cross-section taken on line 9—9 of Fig. 8.

Thin and substantially flexible materials that are very sensitive to touch and have only a limited amount of stiffness, are usually tested in a manner slightly different from that described above. For this purpose, the pendulum and driving disc are provided with registering openings 73. A gauge block 74 is provided with an aperture 75 for receiving stud 17 on the pendulum so that the gauge block may be mounted on the pendulum with a locking stud 76 on the gauge block projecting through registering openings 73 in the pendulum and into the driving disc for retaining the pendulum and the driving disc against relative movement. Gauge block 74 has a supporting face 77 against which the length of the specimen can be gauged when placing it in specimen clamp 19. A clip weight 78 is attached to the lower end of the specimen for loading the free end of the specimen in a desired manner.

Loading arms 25 are reversed from the position shown in Fig. 1 to that shown in Fig. 8 by pulling them forwardly in the manner above described and rotating them on studs 28 into an opposite position so that the tapered points on pins 35 will extend toward each other in spaced opposed relation. The control handle 60 is then operated in the manner above described, to secure movement of driving disc 5 and pendulum 15 together relative to scale plate 1. This movement is continued until clip weight 78 touches the pointed end of one of the pins 35. The stiffness reading is taken and the disc is then driven in the opposite direction until clip weight 78 engages the other pin 35, when the second reading is taken. After this, the readings are averaged for securing the stiffness of the specimen.

Figures 4, 10:
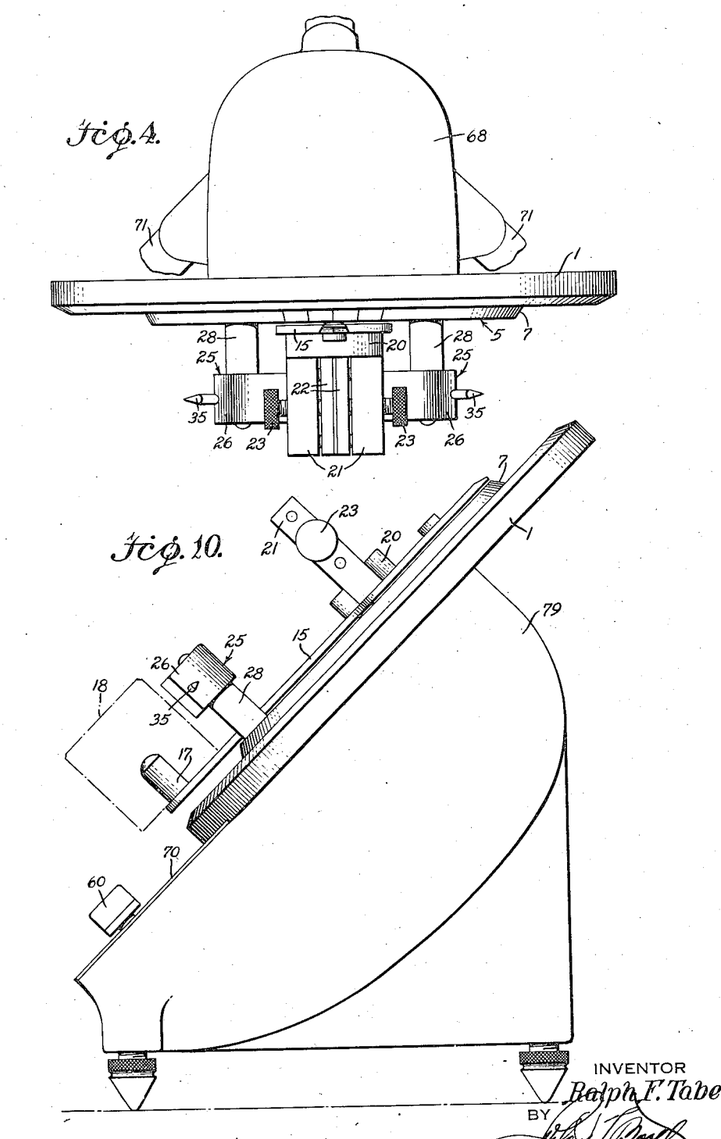
Fig. 4 is a top plan view of the testing apparatus.
Fig. 10 is a side elevation showing a modified form of testing apparatus having the scale plate assembly structure mounted on an angle and having a housing eliminating the use of the supporting legs.

In cases where the gauge is to be used by an operator in a position substantially below eye level, it is desirable for convenient operation and reading of the instrument, to have scale plate 1, driving disc 5 and pendulum 15 arranged at an angle of approximately 45° to the horizontal. For this purpose, it is not necessary to make any change in the structure of the scale plate, driving disc or pendulum, or the motor and control unit or its assembly on the scale plate. This result is obtained by providing a form of housing for mounting the assembly of the parts on the scale plate, similar to that shown in Fig. 10 at 79. This housing has an open upper inclined face on which the scale plate is supported with the motor and control unit housed therein.

Figures 12, 13, 14, 15:
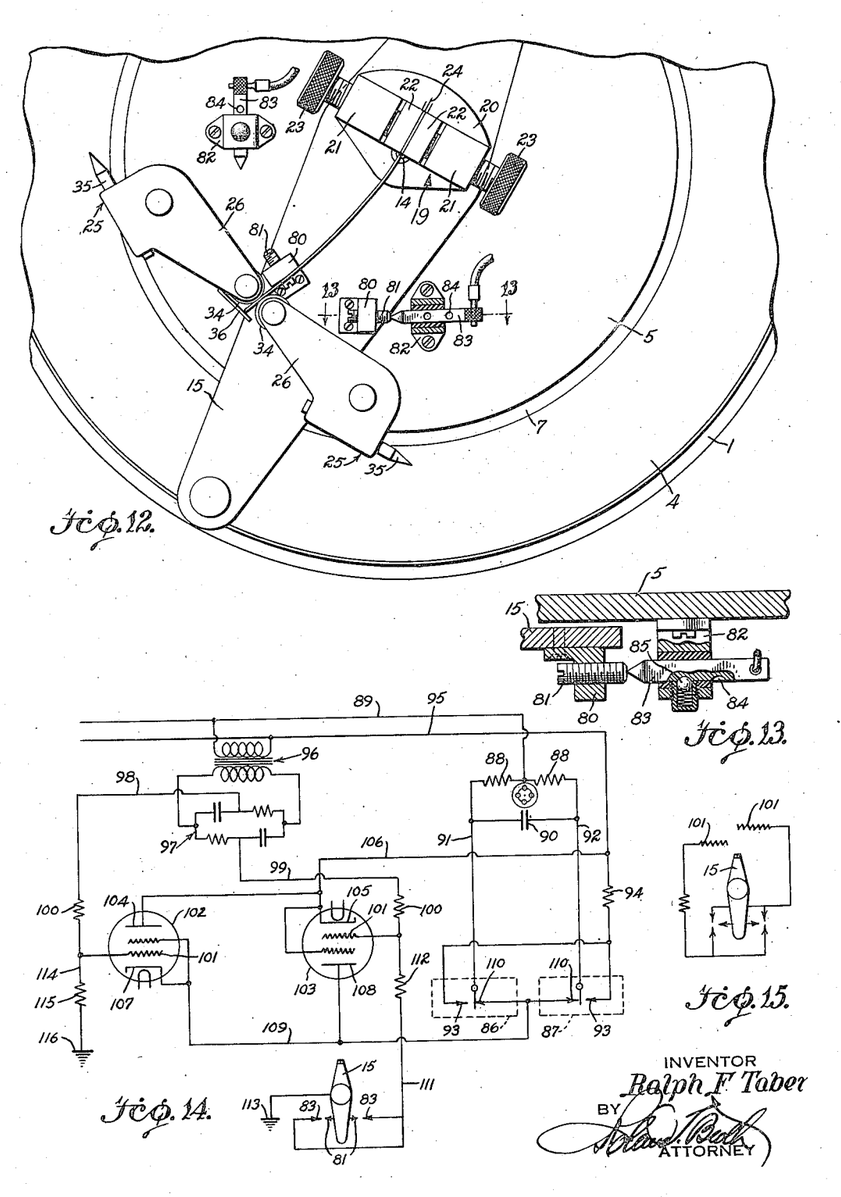
Fig. 12 shows a fragmentary front elevation of an instrument constructed as shown in Fig. 1 equipped with an automatic control for automatically stopping the motor when a test specimen is flexed a given amount.
Fig. 13 is an enlarged detail cross-section taken on line 13—13 of Fig. 12.
Fig. 14 is a wiring diagram showing the automatic control circuits for the apparatus shown in Fig. 12.
Fig. 15 is an alternate circuit arrangement of a portion of the wiring diagram illustrated in Fig. 14.

Figs. 12 and 13 illustrate how an automatic control for the motor drive may be constructed so that the motor will be automatically stopped whenever the test strip is flexed to a desired extent, such as to the 7½ or 15° angles provided in the instrument herein described. Fig. 12 shows a front elevation of the instrument built as shown in Fig. 1, similar reference numerals being used to identify corresponding parts and in addition, shows how contact members may be added to the pendulum and driving disc to close the circuit for stopping the motor automatically when a test specimen has been flexed a given amount. For this purpose, pendulum 15 is provided with a pair of projections 80 on the lower end portion at opposite sides thereof, projecting forwardly in the manner shown in Fig. 12 for supporting a pair of contacts 81 in the form of suitable screws threaded in the outer ends of projections 80. These contacts are electrically grounded to the pendulum and to the other metal parts of the apparatus.

Driving disc 5, as illustrated in Fig. 12, carries a pair of terminal posts 82 arranged in spaced relation on opposite sides of pendulum 15 in arcuate relation to projections 80 so that contact members 83, one being slidably mounted in each terminal post 82 will have the contact point on one end thereof arranged for engaging with contact 81 when the pendulum has flexed a specimen a given amount. Each contact 83 is provided with a pair of longitudinally spaced sockets 84 for receiving a spring pressed ball 85 (Fig. 13) mounted in terminal post 82 for normally retaining contact member 83 in either of two positions of adjustment. One of these positions is for engaging contacts 81 when a test specimen has been flexed 7½° as provided for in the instrument herein disclosed, while the other position for contact member 83 is provided for the engagement thereof with contact 81 when the test specimen has been flexed 15°.

Figs. 12 and 13 show how contact members 83 are slidably mounted in sleeves carried by insulating sleeves on the outside thereof which in turn engage and mount the contact members in terminal posts 82 so that, with a similar mounting for spring pressed ball 85, contact members 83 are insulated from terminal posts 82 and the driving disc. The ends of terminal posts 82 opposite to that adapted to contact with contacts 81, receive flexible wire connections for electrically connecting contact members 83 in the control circuit for the motor in a manner that will now be described.

With an automatic control for the motor, as shown in Figs. 12 to 15, only the two direction control switches 52 and 53 are employed in manually closing the circuit for securing flexing of a test specimen in one direction or the other. These direction control switches are indicated in Fig. 14 at 86 and 87 respectively, and are shown as double-throw, single-pole switches.

The motor, as indicated in Fig. 14, is a reversible induction motor and has two field windings, each being adapted to secure operation of the rotor in one direction. These field windings are indicated at 88. One end of each field winding 88 is shown as being connected to one side of an alternating current supply circuit 89. A condenser 90 is connected across the opposite terminals of field windings 88, each of which is connected to the movable contact of one of switches 86 and 87, by wires 91 and 92, respectively. The outer terminals 93 of Microswitches 86 and 87 are connected through resistance 94 to the other side of the alternating current supply circuit 95. It will thus be seen that when the movable switch contact of either of switches 86 or 87 is moved to engage the outer contact 93, the current supply will be connected to the motor for rotating the armature in either one direction or the other depending upon which of switches 86 and 87 is operated.

The means for stopping the motor when it has flexed a test specimen a given amount, will now be described. A transformer 96 has the primary terminals thereof, connected to the alternating current supply wires 89 and 95, respectively. The terminals of the secondary of transformer 96 are connected to a phase shifting network indicated at 97, consisting of two resistors and two condensers connected in series. The terminals of the secondary of transformer 96 are connected in the circuit so that a resistor and condenser are connected in each of two circuits in parallel with the opposite terminals of the transformer secondary. The connection between the condenser and resistor in each of the parallel circuits of the network 97 is connected through wires 98 and 99 respectively through a pair of resistors 100 to control grids 101 respectively, of a pair of "Thyratron" control tubes 102 and 103, respectively. The electronic tubes, known as "Thyratron" tubes, indicated at 102 and 103 are connected together in what is known as a back-to-back circuit arrangement, as shown in Fig. 14 in which anode 104 of tube 102 is provided with a circuit connection with cathode 105 of tube 103 by means of wire 106 which is in turn connected to alternating current supply wire 95. Cathode 107 of tube 102 is connected in circuit with anode 108 of tube 103 by wire 109 having circuit connection with the inner contacts 110 of microswitches 86 and 87, as shown in Fig. 14.

Control grid 101 of tube 103 has a circuit connection through wire 111 including resistor 112 with contact members 83 on driving disc 5, as shown in Fig. 12. Contacts 81 on pendulum 15 are grounded as indicated at 113 in Fig. 14. Control grid 101 has a wire connection 114 through resistor 115 with ground 116. The grounds 113 and 116 are to the scale plate and body metal of the testing apparatus in order that a circuit connection may be made from contact 81 to control grid 101 of tube 102.

It will be understood that control grids 101 of tubes 102 and 103 will be maintained at a sufficiently negative potential relative to cathodes 105 and 107, so long as contacts 81 and 83 are out of engagement, by means of the circuit through network 97 and wires 98 and 99 from alternating current supplied to the control grids from the alternating current supply circuit through wires 89 and 95 and transformer 96. The potential of grids 101 of tubes 102 and 103 is normally sufficiently negative by virtue of its phase difference relative to their anodes, so that firing will not take place. However, whenever pendulum 15 flexes a test specimen in one direction or the other to the desired limit of movement, one of the contacts 81 will engage one of the contact members 83 and close the circuit through wires 111 and 114 to both control grids thereby providing a series circuit from the transformer secondary through the resistors in network 97 in which the resistors of network 97 and resistors 100, 112 and 115 will be in series thereby changing the potential to grids 101 and allowing tubes 102 and 103 to fire so that current will flow from the anode to the cathode of each tube and include the winding 88 of the motor not being used to produce rotation of the armature in series across A. C. current supply wires 89 and 95. This series circuit includes wire 109 and the micro-switch that has the movable switch contact engaged with the inner contact. Resistor 94 equalizes the voltage drop across both field windings 88 so that the motor is stopped immediately upon the tubes firing by magnetic operation of both fields on the armature of the motor. By using this electronic control system for stopping the motor and using it as a magnetic brake, the rapid and sensitive operation of the automatic control will operate to immediately stop flexing of a test strip when flexed the given amount and hold the strip in the flexed position.

By substituting the circuit arrangement shown in Fig. 15 for the portion of the circuit shown in Fig. 14 connecting the control grids with the pendulum, the ground connections shown in Fig. 14 can be eliminated.

It will be clear from the foregoing description and the disclosure in Patent No. 2,063,275 how contacts may be used with a sensitive attachment and included in the control circuit shown in Fig. 14 for automatically stopping the motor when tests with the sensitive attachment are being made.

The invention claimed is:

1. An instrument for measuring the stiffness of flexible materials, comprising a plate, a pair of relatively movable members mounted on one side of said plate, means for retarding movement of one of said members relative to the other, one of said members having means for supporting one end of a strip of material of fixed size to be tested with the other end engaging means on the other member, power actuating means mounted on the other side of said plate for operating said other member through the plate to flex said strip by movement relative to said one member, manually operable means mounted on said plate operable from said one side thereof for controlling said power actuating means to secure flexing of said strip a given amount, said plate and movable members having means for indicating the stiffness of said strip when flexed said given amount, and a housing enclosing said power actuating means and portions of said manually operable means having a margin defining an open side engaging said other side of said plate and secured thereto with said plate closing said open side.

2. An instrument for measuring the stiffness of flexible materials, comprising a scale plate, a pair of relatively movable members mounted on one side of said plate, means for retarding movement of one of said members relative to the other, one of said members having means for supporting one end of a strip of material of fixed size to be tested with the other end engaging means on the other member, a switch plate detachably mounted on the other side of said scale plate, a power actuated motor mounted on said switch plate and operably connected through said plates to move said other of said members for flexing said strip a given amount in relative movement to said one member, said relatively movable members and scale plate having cooperative means for indicating the stiffness of said strip when flexed said given amount, and manual control means mounted on said switch plate for controlling operation of said motor in flexing said strip.

3. An instrument for measuring the stiffness of flexible materials, comprising a scale plate, a driving disc in front of said scale plate, a pendulum in front of said disc, interengaged bearing members extending from the rear of each of said pendulum, driving disc and scale plate, extending to the rear of said scale plate and rotatably mounting said pendulum and disc for relative movement to each other and said scale plate, means normally resisting movement of said pendulum from a given position, said pendulum, disc and scale plate having indicating means thereon for cooperation to register relative movement of said pendulum and disc to each other and said scale plate, a switch plate mounted on the rear face of said scale plate, a power actuated motor mounted on said switch plate in the rear of said scale plate connected for rotating said driving disc in the operation thereof, control means mounted on the rear face of said switch plate for controlling operation of said motor, said control means having a handle extending through said switch plate for manual operation of said means thereby from in front of said switch plate, a housing receiving and enclosing said bearing members, motor and control means having an open side over which said scale and switch plates are engaged and attached thereto for support of the scale plate and assembled elements, means on the pendulum for supporting one end of a strip of material of fixed size to be tested, and means on said driving disc adapted to engage the other end of said test strip, whereby operation of said driving disc for flexing a test strip may be secured to indicate the stiffness of said test strip when the indicating means on said pendulum, disc and plate are in a predetermined position.

4. An instrument for measuring the stiffness of flexible materials, comprising a pair of relatively movable members, means for retarding movement of one of said members relative to the other, one of said members having means for supporting one end of a strip of material of fixed size to be tested with the other end engaging means on the other member, a reversible electric motor for operating the other of said members to secure flexing of said strip in relative movement to indicate the stiffness of said strip when flexed a given amount on a scale on said members, a pair of normally closed switches each controlling a circuit for securing operation in a direction opposite to the other, a normally open switch manually operable to close the circuit to said motor for both directions of operation to hold said motor and driving disc against movement in both directions, and manually operable means for selectively engaging and moving said normally closed switches to open position for securing selective operation of said motor in one direction or the other in securing the flexing of said strip when said last-mentioned switch is open, and said manually operable means being engageable with said normally open switch for selectively operating it into closed position.

5. An instrument for measuring the stiffness of flexible materials, comprising a pair of relatively movable members, means for retarding movement of one of said members relative to the other, one of said members having means for supporting one end of a strip material of fixed size to be tested, a pair of opposed loading arms rotatable on a pair of stub shafts mounted on said other member, each arm having a long section and a short section, a roller mounted in the free end of the long section having the periphery projecting beyond the end of the arm, a pin in each short section having a pointed end projecting beyond the short end of said arm, and means for retaining each arm in either of two positions whereby in one position the rollers in said loading arms will be in adjacent position to engage faces of said other end of said strip and said pins may be moved into opposed spaced relation in the other position, and said members being operable to secure flexing of said strip in relative movement and for indicating the stiffness of said strip on a suitable scale when fixed a given amount.

6. An instrument for measuring the stiffness of flexible materials, comprising a pair of relatively movable members, means for retarding movement of one of said members relative to the other, one of said members having means for supporting one end of a strip of material of fixed size to be tested, a pair of loading arms mounted in spaced opposed relation on said other member for movement of each end of each arm into position extending toward the opposite arm, each arm having a roller in one end and a pointed pin projecting from the opposite end, whereby said rollers and pins may be selectively arranged in opposed relation for engagement with opposite sides of said other end of said strip, said members being operable to secure flexing of said strip in relative movement for indicating the stiffness of said strip on a scale thereon when flexed a given amount.

7. An instrument for measuring the stiffness of flexible materials, comprising a plate, a bearing sleeve projecting rearwardly in perpendicular relation from said plate, a driving disc in front of and rotatable relative to said plate, a bearing member projecting rearwardly from said disc engaged in said bearing sleeve and rotatably mounting said disc on said plate, a shaft rotatably mounted in said bearing member, a retaining member having a flange on the rear end adjustably mounted on the rear end of said bearing member providing a bearing support for the rear end of said shaft, means adjustably securing said retaining member in said bearing member, a retaining collar on said retaining member between said flange and the end of said bearing member, means adjustably securing said retaining collar to said bearing sleeve for cooperation to retain said bearing member and disc in a desired position of adjustment relative to said plate, a pendulum on said shaft in front of said disc movable relative to said disc and plate and normally held in one position, and means on said pendulum and disc for supporting and engaging spaced portions of a strip to be tested in relative movement of said disc and pendulum to indicate the stiffness thereof on a scale on said plate.

8. An instrument for measuring the stiffness of flexible materials, comprising a plate having an annular recess in the front face, a bearing sleeve on said plate concentric with said recess, a driving disc in front of and rotatable relative to said plate over said recess in concentric relation, a bearing member carried by said disc engaged in said bearing sleeve and rotatably mounting said disc on said plate, a shaft rotatably mounted in said disc and bearing member, a pendulum mounted on the forward end of said shaft normally held in one position in front of said disc and plate, a driven member mounted on the rear face of said disc about said bearing member and housed in the recess in said plate, a motor mounted on the rear face of said plate having a drive shaft extending through an aperture formed in said plate into said annular recess, and a driving member on said shaft in said recess in aligned relation to said driven member for transmitting the driving power of said motor to said driven member for rotating said driving disc, manual control means mounted on said plate for controlling operation of said motor, and means on said disc and pendulum for supporting and flexing a strip to be tested in relative movement thereof to each other and said plate for indicating the stiffness of said strip on a scale on said plate.

9. In an instrument for measuring the stiffness of flexible materials wherein a pair of relatively movable members are provided with means for supporting and flexing a test strip and indicating the stiffness of said strip when flexed a given amount, the combination of an electric motor having a pair of field windings each winding securing motor operation in a direction opposite to the other, means connecting said motor to one of said members for moving said member a pair of switches each controlling the circuit to one of said field windings, means mounting said switches in adjacent spaced relation, a switch operating member having portions to engage and selectively operate one of said switches in movement in opposite directions to secure operation of said motor in one direction, and means operable by said switch operating member to connect both of said windings in circuit for stopping rotative movement of said motor and retaining said one of said movable members against relative movement.

10. In an instrument for measuring the stiffness of flexible materials wherein a pair of relatively movable members are provided with means for supporting and flexing a test strip and indicating the stiffness of said strip when flexed a given amount, the combination of an electric motor having a pair of field windings, each winding securing motor operation in a direction opposite to the other, means connecting said motor to one of said members to transmit power for moving said member a pair of switches each controlling the circuit to one of said field windings, means mounting said switches in adjacent spaced relation, a switch operating member having portions to engage and selectively operate one of said switches in movement in opposite directions to secure operation in one direction, and electronic control means for stopping said motor by cooperation in energizing both field windings having a pair of electron discharge tubes connected in a back to back circuit with said field windings, and a grid circuit for said tubes controlling the energization of said back to back circuit by said tubes until said test strip has been flexed a given amount.

RALPH F. TABER.

REFERENCES CITED

The following references are of record in the file of this patent:

UNITED STATES PATENTS

| Number | Name | Date |
| --- | --- | --- |
| 1,556,201 | Busemann | Oct. 6, 1925 |
| 1,607,649 | Scholl | Nov. 23, 1926 |
| 2,049,235 | Tour et al. | July 28, 1936 |
| 2,063,275 | Taber | Dec. 8, 1936 |
| 2,092,809 | Masten | Sept. 14, 1937 |
| 2,131,805 | Howe | Oct. 4, 1938 |